Dec. 12, 1939.                S. M. ANDERSON                2,183,387
                          AIR CONDITIONING SYSTEM
                  Original Filed July 14, 1937    2 Sheets-Sheet 1
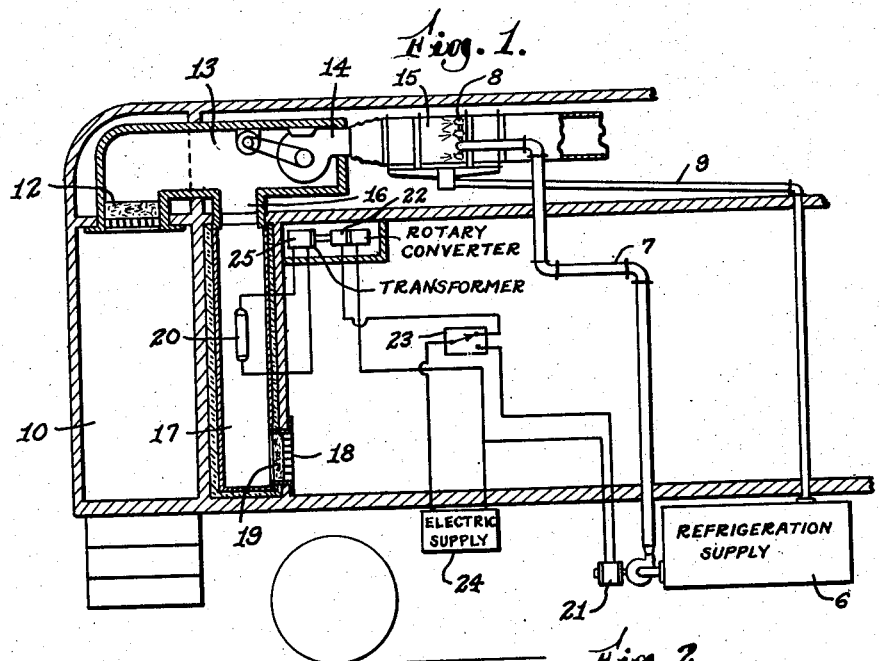
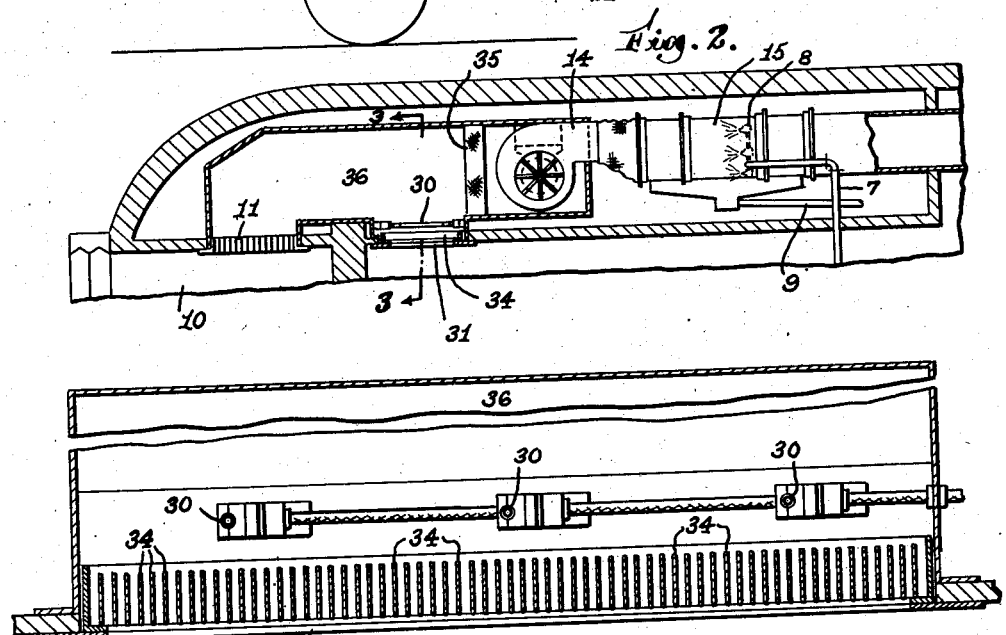
Inventor
SAMUEL M. ANDERSON
by Robert J. Palmer
   Attorney Dec. 12, 1939.   S. M. ANDERSON   2,183,387
AIR CONDITIONING SYSTEM
Original Filed July 14, 1937   2 Sheets-Sheet 2

Inventor
SAMUEL M. ANDERSON
by Robert T. Palmer
Attorney

Patented Dec. 12, 1939

2,183,387

UNITED STATES PATENT OFFICE 2,183,387

AIR CONDITIONING SYSTEM

Samuel M. Anderson, Sharon, Mass., assignor to
B. F. Sturtevant Company, Hyde Park, Boston, Mass.

Application July 14, 1937, Serial No. 153,503
Renewed May 5, 1939

6 Claims. (Cl. 250—43)

This invention relates to the conditioning of air and relates more particularly to methods and apparatus for the temperature conditioning and purification of air.

This application is a continuation in part of my co-pending application Serial No. 111,819, filed November 20, 1936.

Spray type conditioning systems for passenger vehicles such, for example, as railroad passenger cars are preferred for the reasons that they not only effectively temperature condition the air but by washing it, they remove impurities, odors and to a certain extent, bacteria and germs from the air. Due, however, to the practice of reconditioning air recirculated from the passenger space, for reasons of economy, experience has shown that the conditioning of the air supplied to the passengers especially where washers are not used, does not sufficiently remove germs such as disease bearing germs from the air. It has been determined for example, that the coughing of one passenger adds many germs to the air in his or her vicinity, which air is recirculated through the conditioner and supplied with the germs to the other passengers of the car.

According to this invention, the air supplied to the passengers is not only temperature conditioned, but is irradiated with concentrated ultra-violet light which effectively kills the bacteria carried by the air. When the temperature conditioner is not operating the sterilization continues.

In one embodiment of the invention, the recirculated air entering the conditioner is directed through a prolonged passage throughout which it is exposed to concentrated ultra-violet light.

According to a feature of the invention, the air guiding passages in which the ultra-violet light generators are placed, have inner surfaces of aluminum or other material which efficiently reflects instead of absorbing, ultra-violet light radiations.

An object of the invention is to effectively purify and otherwise condition the air supplied to humans.

Another object of the invention is to provide in an air conditioner for passenger vehicles, economical and effective means for destroying the bacteria in the air.

Other objects of the invention will be apparent from the following description taken together with the drawings.

The invention will now be described with reference to the drawings of which:

Fig. 1 is a partial structural, and a partial diagrammatic view of one embodiment of the invention installed in a railroad passenger car.

Fig. 2 is a longitudinal sectional view of another embodiment of the invention in a railway passenger car;

Fig. 3 is an enlarged sectional view along the lines 3—3 of Fig. 2;

Figure 4:
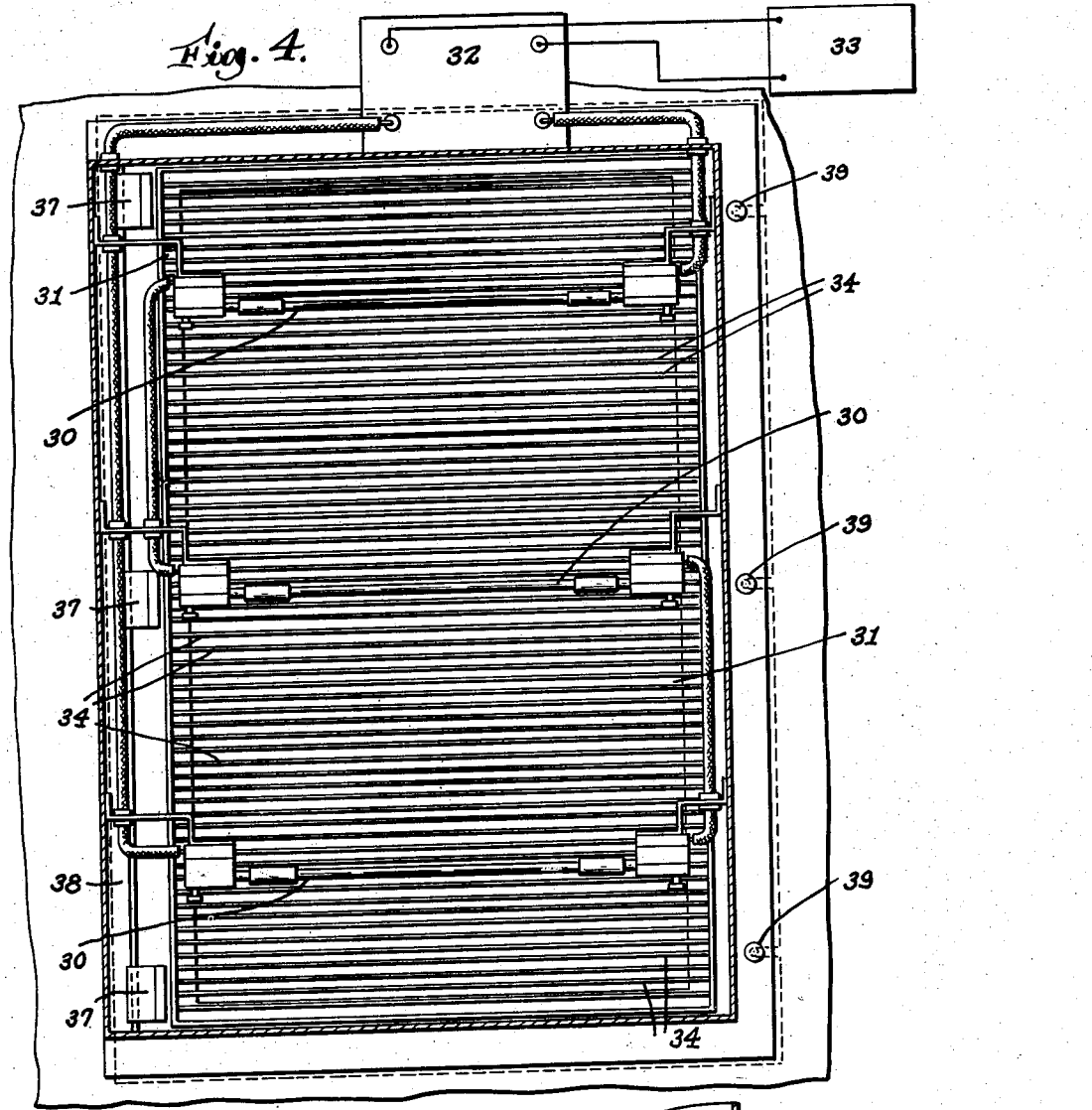
Fig. 4 is an enlarged plan view looking downwardly upon the generators of ultra-violet light and the recirculated air grille of Fig. 2.

The preferred form of air conditioner employed is one utilizing sprays for washing and cooling the air in summer, and for humidifying the air in winter. This form of conditioner is indicated generally by the reference character 15, and is supplied with fluid from the fluid supply 6 through the pipes 7 to the spray nozzles 8. The fluid is returned from the conditioner through the pipes 9 to the fluid supply. Such a conditioner includes coils which may be supplied with steam for heating air in winter, and may also be supplied with auxiliary cooling coils. Such a conditioner is described in detail by my application, Serial No. 107,019, filed October 22, 1936. The conditioner which is mounted in the roof zone of the car is supplied with fresh outside air which enters from the vestibule 10 through the inlet 11 and passes through the filter 12 into the mixing chamber 13 in which the fan or fans are mounted. Recirculated air from the passenger space passes through the recirculated air inlet 16 into the mixing chamber 13 and the mixed recirculated and outside air is forced by the fan 14 through the conditioner 15 and then into the passenger space.

In one form of the invention, the recirculated air passage 17 extends from the floor zone of the passenger space to the recirculated air inlet 16, as illustrated by Fig. 1 of the drawings. Recirculated air enters through the grille 18, passes through the filter 19, and thence into the recirculated air passage 17. Mounted in the recirculated air passage 17 are one or more of the ultra-violet light generators 20. The recirculated air by being confined in the passage 17 is exposed to the concentrated radiations from the generator 20 through being passed closely thereby, and through being exposed to the influence of the ultra-violet light through the prolonged passage extending from the floor to the ceiling of the car.

The recirculated air passage 17 is preferably lined with an efficient reflector of ultra-violet light, such as aluminum or other suitable material, such as will be described in the following. By providing an effective reflector of ultra-violet light in this passage, the effect of the generator 20 is multiplied, due to the continuous reflection of the light, and as a result, the recirculated air is exposed to concentrated ultra-violet light radiations throughout its travel through the prolonged passage 17.

In the embodiment illustrated by Figs. 2, 3, 4 and 5, several ultra-violet lamps 30 are mounted above the recirculated air grille 31 which may be in the car ceiling as illustrated. Three lamps 30 are connected in series with each other and are energized from the converter 32 which may be supplied with electrical current from the source 33. The filter 35 in this embodiment may be mounted between the air inlets and the fan 14.

The grille 31 contains the plurality of substantially vertical members 34 which perform two functions. One is to prevent the light from the lamps 30 from being seen by passengers who pass underneath the grille 31, unless they sight along the lines of the members 34. In this way accidental injury to the eyes of passengers from the very strong ultra-violet light is minimized. The other function is that of multiple reflection. The members 31 as are the walls 36, are constructed of aluminum or other substance which efficiently reflect ultra-violet light. The light from the lamps 30 is reflected back and forth many times between the members 34 with the result that the air entering the grille is more efficiently exposed to the irradiations.

Figure 5:
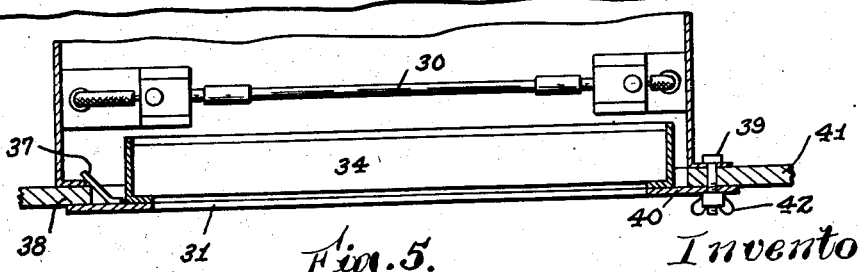
Fig. 5 is an enlarged view of the ultra-violet lamp mounting and recirculated air grille of Fig. 2.

The grille 31 may be easily removed to permit servicing of the lamps 30 by the arrangement shown by Fig. 5. It is held at one end by the flanges 37 resting on the member 38, and at the other end by the bolts 39 which extend through the extension 40 of the grille 31 and the structural member 41. By removing the wing nuts 42 from the bolts 39, the right hand side (facing Fig. 5 of the drawings) drops down and the flange 37 slides past the member 38.

The type of ultra-violet light generator illustrated, is one in which the ultra-violet light is generated by the ionization of a gas such as mercury vapor. These lights are now manufactured and sold by the Hanovia Chemical and Manufacturing Co. of Newark, New Jersey. Other forms of ionizing devices are described in the text "Artificial Sunlight" by Luckiesh, published in 1930, by D. Van Nostrand Company, New York city. The generators manufactured by the Hanovia Chemical and Mfg. Co. have the form illustrated in the drawings, and by their shape as well as by their performance adapt themselves readily to railroad car installations.

The ultra-violet lamps 20 are energized from the electric supply source 24 which may be direct current. The specially designed rotary converter 22 then converts this direct current to alternating current which may be stepped up by the transformer 25 to the voltage required to ionize the gas in the lamps. In Fig. 4, the lamps are shown connected in series, but they, of course, may be connected in parallel relationship. It is of course, obvious that where an ultra-violet lamp is of the type requiring high voltage direct current for ionization, a suitable rectifier may be provided for changing the high voltage alternating current to high voltage direct current.

It has, of course been the practice in the past to use ultra-violet light generators for the production of artificial sunlight, but as brought out in Dr. Luckiesh's text, above referred to, the main thought in the past has been to provide a generator of ultra-violet light which approximated sunlight both in intensity of radiation and in the frequency of light radiations. So, in the past for the generation of artificial sunlight, only those light frequencies have been generated or have been permitted to be radiated which were not harmful to the eyes or skin of the persons exposed to the light. In the past, the trend of development has been towards a generator which emitted visible light for illumination, and relatively weak ultra-violet light for producing the effect of sunlight. The purpose of the generation of this restricted frequency of ultra-violet light with limited strength has been to produce indoors, the benefits ordinarily produced by sunlight in summer.

But, the producers of artificial sunlight such as has been described above do not radiate ultra-violet light of sufficient strength and frequency coverage to destroy to any appreciable degree, harmful bacteria in the air. Were bacteria killing rays projected, they would harm not only the eyes, but the skin of the persons exposed to them.

According to this invention, there is no attempt to produce a condition which might be called artificial sunlight. The ultra-violet lamps may therefore be constructed to produce highly concentrated ultra-violet light having high intensity with the frequency range and strength of irradiation such that they would be very harmful if projected upon the skin or exposed to the eyes of humans.

It has been determined that the strength of the ultra-violet radiations varies substantially inversely as the square of the distance from the generator. It is therefore desirable to pass germ carrying air as close to the source of ultra-violet light as possible. This is provided, according to this invention, by elongated passages through which the air throughout its entire passage is exposed to concentrated ultra-violet light. It is preferred that only recirculated air be irradiated. This, because it is the air which would normally carry infection. The outside air is normally presumed to be substantially pure. By limiting the irradiation to the recirculated air, the total volume of air to be treated is less and its treatment therefore may be made more effective for a given size and capacity of equipment.

As mentioned in the foregoing, the recirculated air passages may be lined with aluminum or some other material which reflects, instead of absorbs ultra-violet light. Among such other materials are the following:

Aluminum oxide
Antimony oxide pigment
Basic carbonate (white lead)
Lithopone
Magnesium carbonate
Magnesium oxide
Sublimed white lead
Titanium pigment
Zinc oxide
Zinc sulphide Where pigments or paints are used, the air guiding passages may of course be sprayed with the reflecting material.

Ozone is generated during the operation of the ultra-violet light generators and this on passing into the spray chamber produces hydrogen peroxide in the spray water which in itself is effective in killing the germs carried by the water. Carbonates are formed by the action of the ultra-violet light upon organic substances carried by the air, and it is therefore preferred that the ultra-violet light generators be placed in advance with respect to air flow of the sprays which effectively wash this solid matter from the air.

On some railroad passenger cars, the capacity of the current supply source is limited. Such cars usually use ice as the source of refrigeration. On such cars, it would not be desirable to operate the pump motor 21 and the rotary converter 22 simultaneously. Accordingly therefore, the switch 23 which is ordinarily used to deenergize the pump motor 21, is connected to the circuit of the rotary converter 22 to energize the rotary converter when the pump is shut down, and vice versa. In such case, the sprays would act to purify the air to a substantial degree while the ultra-violet light generators would purify the air when the sprays are inoperative. For example, the sprays may be operative in summer when their cooling effect is required, and may be inoperative in winter when it is not desired to add moisture to the air for humidification.

While embodiments of the invention have been described for the purpose of illustration, it should be understood that the invention not be limited to the precise apparatus and arrangements described, since many departures may be suggested by those skilled in the art, without departing from the spirit of the invention.

What is claimed is:

1. Apparatus for conditioning the air supplied to a vehicle having a passenger compartment comprising an air conditioning unit located above the ceiling of said vehicle, a horizontal recirculated air grille in said ceiling, means forming a recirculated air passage connecting with said grille and said unit, said passage having substantially vertical walls above and immediately adjacent said grille, said grille having a plurality of closely spaced, substantially vertical members, said members and said walls having surfaces which efficiently reflect ultra-violet light, a plurality of elongated tubular ultra-violet lamps arranged in a row above and substantially parallel to said grille and to said members and attached to said walls, and means accessible from said compartment for attaching and removing said grille from said ceiling for providing access to said lamps.

2. Apparatus for conditioning the air supplied to a passenger vehicle comprising a conditioning unit above the ceiling of and adjacent one end of the vehicle, a metal box between said unit and said one end of said vehicle, said box having walls with surfaces which efficiently reflect ultra-violet light, and having an opening for fresh outdoor air, an opening for recirculated air from the passenger space, and having an opening communicating with said unit, said opening for recirculated air containing a horizontal grille at the level of said ceiling, said grille containing a plurality of relatively long, closely spaced, upwardly extending members with surfaces which efficiently reflect ultra-violet light, the length of said members being several times the distance between adjacent of said members, a plurality of ultra-violet lamps arranged in horizontal alignment directly above said grille, and means accessible from below said grille for removing same for providing access to said lamps.

3. Apparatus for conditioning the air supplied to a passenger vehicle comprising a conditioning unit above the ceiling of and adjacent one end of the vehicle, a metal box between said unit and said one end of the vehicle, said box having walls with surfaces which efficiently reflect ultra-violet light, and having an opening for fresh outdoor air, an opening for recirculated air from the passenger space, and having an opening communicating with said unit, said opening for recirculated air containing a horizontal, rectangular grille at the level of said ceiling and extending transverse said vehicle, said grille containing a plurality of relatively long, closely spaced, upwardly extending members with surfaces which efficiently reflect ultra-violet light, the length of said members being several times the distance between adjacent of said members, said box having wall extensions which extend vertically downwardly into said opening for recirculated air, a plurality of ultra-violet lamps attached to said extensions and arranged in horizontal alignment directly above said grille, and means accessible from below said grille for removing same for providing access to said lamps.

4. Apparatus for conditioning the air supplied to a vehicle having a passenger compartment, comprising an air conditioning unit located above the ceiling of said vehicle, a horizontal recirculated air grille in said ceiling, means forming a recirculated air passage connecting with said grille and said unit, said passage having substantially vertical walls above and immediately adjacent said grille, said grille having a plurality of closely spaced, upwardly extending members, said members and said walls having surfaces which efficiently reflect ultra-violet light, a plurality of elongated tubular ultra-violet lamps arranged above and substantially parallel to said grille and attached to said walls, and means accessible from said compartment for attaching said grille to said ceiling whereby it may be displaced for providing access to said lamps.

5. Apparatus for conditioning the air supplied to a passenger vehicle, comprising a conditioning unit above the ceiling of said vehicle, a metal box connecting with the inlet of said unit and having walls which efficiently reflect ultra-violet light, said walls extending through an opening in said ceiling to form a recirculated air passage, a grille containing a plurality of relatively long, closely spaced, upwardly extending members with surfaces which efficiently reflect ultra-violet light, in said passage at the level of said ceiling, the length of said members being several times the distance between adjacent of said members, a plurality of tubular ultra-violet lamps arranged in said passage directly above and substantially parallel to said grille, and means accessible from below said grille for displacing same for providing access to said lamps.

6. Apparatus for conditioning the air supplied to a vehicle having a passenger compartment, comprising an air conditioning unit located above the ceiling of said vehicle, a horizontal recirculated air grille in said ceiling, means forming a recirculated air passage connecting said grille and said unit, a plurality of elongated tubular ultra-violet lamps arranged above, in alignment with and substantially parallel to said grille, and means accessible from said compartment for securing said grille to said ceiling whereby it may be displaced for providing access to said lamps, said passage including a surface which efficiently reflects ultra-violet light so arranged above said lamps as to reflect the ultra-violet light from said lamps downwardly into the space between said surface and said lamps and into said passage towards said unit.

SAMUEL M. ANDERSON.